United States Patent [19]

Hara

[11] 4,333,902
[45] Jun. 8, 1982

[54] PROCESS OF PRODUCING A SINTERED COMPACT

[75] Inventor: Akio Hara, Nishinomiya, Japan

[73] Assignee: Sumitomo Electric Industries, Ltd., Osaka, Japan

[21] Appl. No.: 762,189

[22] Filed: Jan. 24, 1977

[51] Int. Cl.³ .............................................. B29C 1/02
[52] U.S. Cl. .................................. 264/320; 264/325; 264/332
[58] Field of Search ............... 264/320, 332, 317, 221, 264/325

[56] References Cited

U.S. PATENT DOCUMENTS

| | | | |
|---|---|---|---|
| 3,239,323 | 3/1966 | Folweiler | 264/332 |
| 3,562,371 | 2/1971 | Bush | 264/66 |
| 3,939,241 | 2/1976 | Powell et al. | 264/317 |
| 4,007,251 | 2/1977 | Isaksson et al. | 264/332 |

OTHER PUBLICATIONS

Stromberg et al., "Sintering of Diamond at 1800°-1900° C. and 60-65 K bar," Cev. Bull., vol. 49, No. 12, (1970).

Primary Examiner—John A. Parrish
Attorney, Agent, or Firm—Wenderoth, Lind & Ponack

[57] ABSTRACT

A process of producing a sintered compact comprises filling a cup with a powdered material to be sintered, putting on an opening of the cup a covering member consisting of a lid and solder so as to permit ventilation between the interior and exterior of the cup to form a cup assembly, applying heat as well as vacuum to the cup assembly to degas the powdered material, melting the solder by the continuation of heat to air-tightly seal the cup with the lid to obtain a closed cup compressible under high pressure at high temperature while maintaining the air-tight seal, and hot-pressing the closed cup to obtain a sintered compact.

The covering member may include a porous lid closing the cup and a solder put on the porous lid.

12 Claims, 4 Drawing Figures

PROCESS OF PRODUCING A SINTERED COMPACT

The present invention relates to a process of producing a sintered compact under a high pressure at a high temperature.

When hot-pressing a powdered material to produce a sintered compact by means of hot isostatic press or known super-pressure and high temperature apparatus for making a diamond, it provides little problem if the particle size of the material is coarser than several hundred microns, but if it is finer than several ten microns, particularly finer than one micron, it is impossible to obtain a densely concentrated structure if the gas components are not completely removed from the powdered material since numerous pores are contained in the obtained compact.

The above gas components include physically adsorbed gas, chemically adsorbed gas and those existing in the form of oxides or hydroxides at the recesses or surfaces of the particles. Therefore, however high vacuum is applied to the powdered material at room temperature, such gas components generate gases to cause pores in the compact by the heat during hot-pressing.

For example, a vacuum is applied to WC-Co powder mix at room temperature, and thereafter as the temperature rises to about 1000° C., there is generated a great deal of gases such as $H_2O$, $CO_2$, CO and $H_2$.

The following is the consideration on the influence of $O_2$ amount contained in WC-Co powder mix, the amount being generally said to be about 0.3 to 0.6%.

The specific gravity of WC-10% Co alloy is 14.6. Therefore, the weight of 1 cc thereof is 14.6 g. Assuming that the powder mix has an amount of 0.5% of $O_2$;

$$14.6 \times 0.005 \times 1/32 \times 22.4 \times 10^3 = 51.1 (cc)$$

The powder mix is then hot-pressed by means of hot isostatic press under a pressure of 2000 atm at a temperature of 1400° C., this amount of 51.1 cc becomes;

$$51.1 \times 1/2000 \times 1673/298 (room\ temperature) = 0.14 (cc)$$

As a result, WC-10% Co compact must contain 14% of pore. Therefore, it is absolutely impossible to obtain a compact having a density of 100%.

In the case of super-pressure and high temperature apparatus for making a diamond, the material to be sintered is enclosed in a solid pressure medium such as pyrophyllite, and since a tremendous pressure such as 500 to 600 Kg/mm$^2$ is applied to the pressure medium, the escape of gases is almost impossible, similarly in an air-tight container. Therefore, when sintering diamond or cubic (i.e. isometric) boron nitride, which is becoming a recent issue, there arises the same problem as WC-Co powder mix mentioned above.

Upon sintering alumina powder, also the same problem occurs. When the powder material is subjected to gas analysis, there is often generated a gas as much as 1%.

According to the present invention, there is proposed a process of producing a sintered compact comprising filling a cup with a powdered material to be sintered, putting on an opening of the cup a vent means consisting of a lid and solder so as to permit ventilation between the interior and exterior of the cup to form a cup assembly, applying heat as well as vacuum to the cup assembly to degas the powdered material, melting the solder by the continuation of heat to air-tightly seal the cup with the lid, and hot-pressing the cup to obtain a sintered compact.

Accordingly, it is an object of the present invention to provide a process of producing a sintered compact making it possible to obtain a densely concentrated structure by completely degassing a powdered material so as to eliminate pores caused by gases.

It is another object of the present invention to provide an effective process for obtaining with certainty a dense compact by air-tightly sealing a cup containing a powder or green compact during degassing without using specific means.

Other objects and features of the present invention will be apparent from the following description of the invention with reference to the accompanying drawings, in which.

Throughout the drawings, similar parts and elements are denoted by the similar reference numerals and letters.

Figure 1:
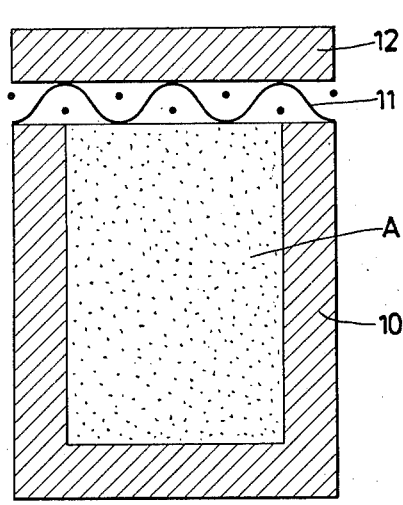
FIG. 1 is a longitudinally sectioned view showing a cup assembly containing a powder or green compact to be sintered.
Figure 2:
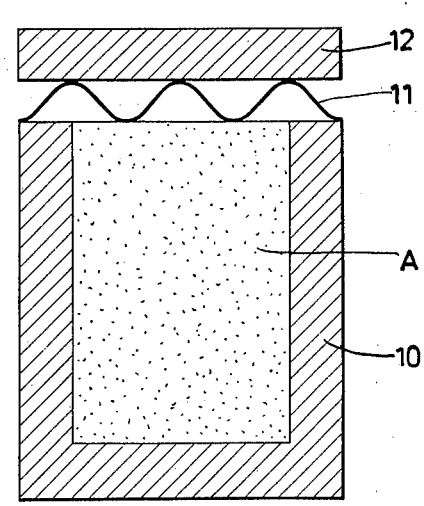
FIG. 2 is the same view showing a modification of a cup assembly.

Referring now to FIGS. 1 and 2, the numeral 10 designates a cylindrical cup, in which is contained a powdered material A to be sintered. The material may be powder or green compact made by cold-pressing the powder. On an opening of the cup 10 is put a vent member 11 made of solder to permit the air to pass. A lid 12 is put on said solder member 11 thereby allowing ventilation between the interior and exterior of the cup 10.

Said vent member 11 may be a net or screen made of solder wires as illustrated in FIG. 1, or may be a corrugated plate as shown in FIG. 2. Though not shown in the drawings, the member 11 can be a split ring made of solder wire, and it is put on the opening of the cup 10. Further the member 11 may be a powdered solder, which is coated on the opening of the cup 10. There can be used any other solder member which permits ventilation.

Said material A to be sintered is diamond, cubic boron nitride or their mixture. Further a suitable binder such as nickel and titanium nitride can be mixed in the material.

If such material has a particle size of several microns or finer, or if the material is mixed with a binder such as nickel powder, other metal powder, titanium nitride powder and other compound powder, it can be previously cold-pressed under a pressure ranging from several ten to several thousand Kg/cm$^2$ to form a green compact.

There can be used any other powdered materials to be sintered such as alumina, mix of tungsten carbide with cobalt, and titanium diboride.

The combination of the solder member 11 and the cup 10 along with the lid 12 is exemplified in Table I.

TABLE I

| Cup and Lid | Solder Member |
| --- | --- |
| Fe or its alloy | Cu or its alloy |

TABLE I-continued

| Cup and Lid | Solder Member |
| --- | --- |
| Mo or its alloy | Cu or its alloy |
| Ti or its alloy | silver solder |
| WC | Co or W—C—Co eutectic alloy |
| W | Cu alloy |
| W | Ni alloy |

The above combination is selected in view of a temperature for the completion of degassing a powdered material to be sintered, and in view of the reactivity to the material.

Among the above, the combination of Fe or its alloy and Cu or its alloy is the most inexpensive and easiest in technical operation.

Figure 3:
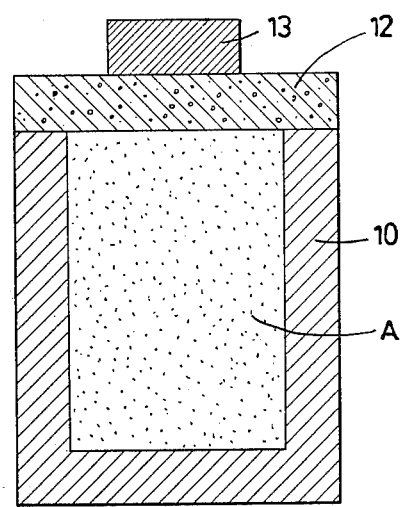
FIG. 3 is the same view illustrating another modification of a cup assembly.
Figure 4:
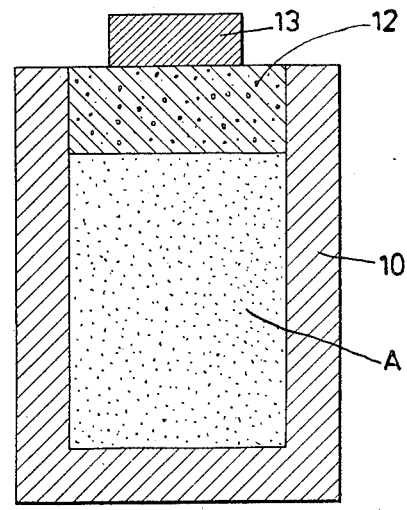
FIG. 4 is the same view of still another modification of a cup assembly.

In the above embodiment, the vent number 11 is inserted between the cup 10 and lid 12. However, as shown in FIGS. 3 and 4, the lid itself can be formed by a porous material such as sintered mass of iron powder to permit ventilation, and thereon is put a solder piece 13. The lid 12 may be fitted in the opening of the cup 10 as appears from FIG. 4.

Though not shown in the drawings, the whole cup 10 or a part thereof can be formed by a porous material such as sintered iron powder. In the case, a solder piece is put adjacent the porous portion.

The following Table II exemplifies the combination of the cup 10, lid 12 and solder piece 13.

TABLE II

| Cup | Lid | Solder Piece |
| --- | --- | --- |
| Ni | sintered Fe powder | Cu alloy |
| Fe or its alloy | sintered Fe powder | Cu alloy or Sn—Pb solder |
| cold-pressed WC powder | cold-pressed WC powder | Co—C—W or Ni |
| Co | sintered Fe powder | Cu alloy |
| cold-pressed Fe powder | cold-pressed Fe powder | Cu |

Preferably these porous materials have a porosity of 20 to 60%.

Thus constructed cup assembly is then subjected to heat as well as vacuum so as to completely degas the powdered material A, and the solder member 11 or solder piece 13 is melted at its melting point by the continuation of heating to air-tightly seal the cup 10. In the cases of FIGS. 1 and 2, the lid 12 is brazed to the cup 10 by the solder member 11. In the cases of FIGS. 3 and 4, the melted solder piece 13 permeates into the porous lid 12, which is in turn brazed to the cup 10, thereby air-tightly sealing the cup.

Preferable heating temperature is at least 500° C. or higher. If the material to be sintered is diamond or cubic boron nitride having a property of reverse phase transition, lower temperature than 1300° C. is preferable.

The vacuum is at least $10^{-2}$ mmHg or higher, and can be applied to a limited part having ventilation, for example, at the opening of the cup 10 through a pipe connected thereto.

The obtained cup is compressible under a high pressure at a high temperature while maintaining the air-tight seal.

The cup is then hot-pressed by hot isostatic press or super-pressure and high temperature apparatus for making a diamond so as to obtain a sintered compact. If the material to be sintered is diamond or high pressure form of boron nitride, it is preferable to hot-press under a pressure of at least 20 Kb or more at a temperature higher than 1000° C. for several minutes to several hours. As for the other materials such as alumina, titanium diboride and mix of tungsten carbide with cobalt, the pressure is several ten to several thousand Kg/cm² and the temperature is 1200° to 2000° C.

The cup thus compressed by the hot-pressing includes a sintered compact and a shell enclosing it. The compact is obtained by removing the shell.

If a diamond compact obtained has its matrix mainly composed of copper, it is non-magnetic and useful as anti-abrasive parts and elements in an electronic computer and household electric machines such as tape recorder. Moreover, it has a property higher in heat conductivity. However, it may generally be lower in toughness as compared to one with a matrix of iron group element. Especially, when used as a cutting tip, the strength is not sufficient at high temperature since the melting point of the copper is lower than that of iron group element.

In contrast, a diamond compact with its matrix mainly composed of nickel or its alloy has properties substantially opposite to the above.

As a result of experiments, the former is obtained by the use of iron cup or cobalt cup in combination with a solder of copper or its alloy, while the latter can be obtained by the use of a cup of nickel or its alloy in combination with a solder of copper or its alloy.

As mentioned before, the hot-pressed cup includes a sintered compact enclosed by a shell of compressed cup. In order to obtain a compact, the shell should be removed. However, this is very difficult, particularly in the case of small compact such as diamond, since the shell is generally in tight engagement with the compact. However, with a cup of iron or its alloy, it has been found that the shell can be readily taken off.

Utilizing the above phenomenon, when putting, for example, a conical block of iron on the center of the bottom of iron cup, a diamond compact having a conical recess at the center thereof can be obtained with ease since the conical block is readily taken off. Therefore, there can be provided a diamond compact having a suitable shape similar to a finished product such as a wire drawing die. Of course, an iron rod and the like can be put in the cup. Considering the difficulty of shaping a diamond compact, this is very useful.

In order to more clearly illustrate the present invention, reference is now to be made to the following Examples, which are only for description rather than limitation to the invention.

EXAMPLE 1

A cup of mild steel having an outer diameter of 14 mm, inner diameter of 7 mm and height of 19 mm was filled with diamond powder having average particle size of 5 micron, while giving vibration. The amount of diamond was 1.6 g.

On an opening of the cup was put, as a solder, a split ring of pure copper wire with a diameter of 1.5 mm, and thereon was put a lid of mild steel having a diameter of 14 mm and thickness of 3 mm.

Thus assembled cup was put in a vacuum furnace, heated to 1150° C. by a rising rate of 500° C. per hour in a vacuum of $10^{-4}$ mmHg, held for 10 minutes, and cooled. The cup taken out of the furnace had its opening air-tightly sealed by the melted copper.

This was hot-pressed by a super-pressure and high temperature apparatus for making a diamond. Initially, the cup was put in the apparatus, given a pressure of 55 Kb, then heated to 1450° C., held at the temperature for 5 minutes, and cooled.

The steel cup was then ground and removed to take out a diamond compact, the specific gravity of which was 4.0. The compact was densely sintered without any pore.

The compact was further ground by a diamond wheel dresser. As a result of examination by microscope, the structure was such that the grains of diamond powder were bonded together, and grain boundaries therebetween were filled with metal. By the analysis of X-ray microanalyzer, it was revealed that this bonding metal consisted of copper and 15% of iron.

Before hot-pressing, the air-tightly sealed cup was cut to find that the inner periphery thereof was filmed with copper used for brazing the lid to the cup, the thickness of copper film being about 0.15 mm. This copper and steel of the cup were considered to permeate into the grain boundaries of diamond powder to form a metal matrix.

EXAMPLE 2

Cubic boron nitride powder having average particle size of 4 micron and titanium nitride powder having average particle size of 1 micron were mixed in a volume ratio of 3:2, and filled in a cup of molybdenum having an outer diameter of 14 mm, inner diameter of 10 mm and height of 6 mm.

On an opening of the cup was put, as a solder, a screen of 32 mesh (hereinafter referred to as U.S. standard) made of bronze, the screen having a diameter of 14 mm, on which was put a lid of molybdenum with a diameter of 14 mm and thickness of 3 mm.

Thus assembled cup was put in a vacuum furnace in the same manner as Example 1, heated at 1100° C. in a vacuum of $10^{-4}$ mmHg, and cooled. The lid and cup taken out of the furnace were air-tightly brazed together by the melted bronze.

This cup was hot-pressed by the super-pressure apparatus in the same manner as Example 1. The obtained compact exhibited Vickers hardness of 3600, and was densely sintered.

EXAMPLE 3

Instead of the molybdenum cup of Example 2, there was prepared a cup of pure titanium having the same dimensions.

Then, a diamond powder having average particle size of 5 micron was mixed with 19 weight % of electrolytic copper powder and 3.5 weight % of nickel powder, respectively having a particle size of −325 mesh. The mix was ball-milled in a stainless steel pot by using cemented carbide balls, and filled in said titanium cup.

On an opening of the cup was put a split ring of silver solder (corresponding to JIS-Japanese Industrial Standard, BAg-2, melting point 700° C.), on which was laid a lid of titanium.

Similarly to Example 1, the cup assembly was put in a vacuum furnace, heated to 900° C. in a vacuum of $10^{-4}$ mmHg, and cooled. The cup taken out of the furnace was air-tightly sealed with the melted silver solder.

The cup was pressed under a pressure of 60 Kb by means of the same super-pressure apparatus as Example 1, and then the temperature was raised to 1500° C. The cup was held at the temperature for 5 minutes to be hot-pressed.

The cup was taken out, and ground to obtain a densely sintered diamond compact. This was cut by a diamond cutter, and a piece was brazed to a tool shank by using a silver solder to form a cutting tool.

A cemented carbide rod of WC-12% Co with Vickers hardness of 1300 was cut by said cutting tool, resulting in a satisfactory performance.

EXAMPLE 4

A powdered titanium diboride ($TiB_2$) having average particle size of 3 micron was filled in a titanium cup having an outer diameter of 14 mm, inner diameter of 10 mm and height of 6 mm.

A powder of nickel solder (melting point: 1024° C., particle size: −120 mesh, +200 mesh) consisting of Ni-4.5 Si-2.9 B was added with, as a binder, ethyl cellulose solved in toluene, and agitated. This was coated on an opening of the cup in a thickness of about 3 mm, on which was put a tantalum lid of 2 mm thickness.

In the same manner as Example 1, the cup assembly was put in a vacuum furnace, heated to 1100° C. in a vacuum of $10^{-4}$ mmHg, and cooled.

As a result of examination on the cup taken out of the furnace, the tantalum lid was brazed to the cup without any gap.

The cup was put in a super-pressure apparatus, pressed to 50 Kb, and heated at 1800° C. for ten minutes to be hot-pressed.

The obtained compact had 99% of ideal density. As a result of examination on the structure after polishing the compact by diamond paste, it was assured that it was densely sintered without any pore.

EXAMPLE 5

Diamond powder of average particle size of 5 micron added with 20 weight % of carbonyl nickel powder was ball-milled and mixed for 24 hours in a stainless steel pot by using cemented carbide balls of WC-10% Co. The powder mix was added with 2% of camphor as a lubricant, and cold-pressed under a pressure of 1 t/cm$^2$ to form a pellet having a diameter of 5 mm and height of 5 mm.

In a cup of nickel having an inner diameter of 5 mm, outer diameter of 7 mm was put the pellet, on which was put a porous lid having a diameter of 5 mm made of sintered iron powder with a particle size from 120 mesh to 100 mesh, on which was laid a copper alloy containing 5% of iron and 5% of manganese and having a diameter of 2.5 mm and height of 2 mm.

The cup assembly was put in a vacuum furnace with a diffusion pump, heated to 1150° C. by a rising rate of 500° C. per hour, and cooled. Taking the cup out of the furnace, the melted copper alloy completely permeated into the porous lid, which was in turn brazed to the nickel cup.

This was hot-pressed by means of a super-pressure and high temperature apparatus for making a diamond. Graphite was used as a heating element, and a salt was interposed between the graphite and nickel cup. The cup was hot-pressed under a pressure of 60 Kb at a temperature of 1600° C. for ten minutes to obtain a diamond compact having Vickers hardness of 6500. The density as well as hardness was much superior to that obtained by a conventional process without the degassing treatment of the present invention.

EXAMPLE 6

Super-purity alumina powder having average particle size of 0.4 micron was added with 0.5% of magnesia powder, and subjected to a wet ball-milling in a pot of super-purity alumina lining by using super-purity alumina balls in water for 100 hours. The powder was dried, added with 3% of camphor, and cold-pressed under a pressure of 1 t/cm$^2$ to form a green compact having a diameter of 60 mm and height of 50 mm.

On the other hand, there was prepared a cup having an inner diameter of 60 mm, depth of 70 mm and thickness of 1 mm by cutting a low carbon steel block. In the cup was inserted said green compact, on which was put a porous lid having a diameter of 60 mm and thickness of 1 mm made of sintered iron powder with a particle size from 100 mesh to 50 mesh, on which was laid a copper alloy containing 5% of iron and 5% of manganese.

The cup assembly was put in a vacuum furnace with a diffusion pump, and heated to 1150° C. by a rising rate of 200° C. per hour.

Taking the cup out of the furnace, the copper alloy completely permeated into the porous iron lid and sealed the opening of the cup. Then a disc of low carbon steel having a diameter of 60 mm and thickness of 1 mm was brazed on the opening of the cup so that the whole periphery of the cup was surrounded by the low carbon steel.

This was hot-pressed in an atmosphere of argon gas under a pressure of 2000 atm at a temperature of 1400° C. for one hour by means of hot isostatic press.

The metal surrounding the cup taken out of the press was removed by using HNO$_3$ to obtain an alumina compact. The surface thereof was ground off in a thickness of several mm to obtain a compact as dense as 99% of ideal density (P=3.99 g/cc).

As a result of examination on crystal particles by an electron microscope, they were about 0.8 micron much finer than those obtained by any other conventional processes.

EXAMPLE 7

A cup was formed by a cylindrical member and a bottom lid fitted therein, both being made by cold-pressing WC powder with average particle size of 4 micron. The cup had a thickness of 2 mm, inner diameter of 5 mm and inner depth of 2 mm. Also a top lid having a thickness of 10 mm was prepared by the same material.

In the cup was inserted a green compact of powder mix comprising cubic boron nitride and 20% of titanium nitride, on which was put the top lid, on which was laid a mass of cold-pressed powder mix consisting of Co-C-W so as to form an eutectic alloy.

The cup assembly was subjected to the same degassing treatment as Example 5 in a vacuum furnace, except that the highest temperature was 1350° C. After grinding off the surface of the cup taken out of the furnace so as to eliminate roughness on the surface, the cup was subjected to the hot-pressing in the same manner as Example 5 to obtain a sintered body having a diameter of about 10 mm and thickness of about 6 mm. This was ground to remove WC-Co alloy at the side face and upper face to obtain a cubic boron nitride compact having a cemented carbide as a substrate. This shape was very useful as a tip of a cutting tool.

EXAMPLE 8

Instead of the nickel cup of Example 5, a cup was made from tungsten powder having particle size of 10 micron and instead of copper alloy of Example 5, nickel was used.

The highest temperature in the vacuum furnace was 1500° C.

Similarly, a compact sufficiently sintered was obtained.

EXAMPLE 9

A cup having an inner diameter of 5 mm, outer diameter of 8 mm and depth of 10 mm was formed by cutting carbon steel. A diamond powder having particle size finer than 400 mesh was filled in the cup in a height of 8 mm, while giving vibration, and thereon was put a porous lid made by sintering iron powder of +140 mesh to −100 mesh, on which was further laid a piece of copper alloy including 5% of iron and 5% of manganese.

The cup assembly was put in a vacuum furnace with a diffusion pump, and heated to 1120° C. by a rising rate of 500° C. per hour.

Taking the cup out of the furnace, the copper alloy permeated into the porous iron lid, which was in turn brazed to the steel cup.

This was hot-pressed by means of a super-pressure and high temperature apparatus for making a diamond. As a heating element was used a graphite tube, and salt was interposed between the tube and cup. Further as a pressure medium was used a pyrophyllite.

Initially, the pressure was raised to 60 Kb, and then the temperature to 1600° C. by gradually supplying electrical current. Thereafter the pressure as well as temperature was lowered. The obtained compact was such that the diamond particles were completely impregnated with copper and presented good appearance. Vickers hardness thereof was about 6000.

EXAMPLE 10

Instead of the steel cup of Example 9, 18-8 stainless steel, nickel or cobalt was used, respectively. Each cup was subjected to the same treatment as Example 9, with the same result as Example 9.

EXAMPLE 11

Atomized iron powder was cold-pressed to form a cup having a porosity of 37%. The dimensions of the cup were the same as Example 9. After filling diamond powder of −400 mesh in the cup, a lid formed with the same material as the cup was fitted in the cup, and thereon were accumulated copper wires cut into pieces, the wires having a diameter of 1 mm.

The cup assembly was put in the same vacuum furnace as Example 9, and heated, while supplying hydrogen gas for the reduction of oxides on the surfaces of iron and diamond powders till the temperature is raised to 950° C., the pressure of hydrogen gas in the furnace being held at 300 mmHg. After raising the temperature to 950° C., the furnace was held under a pressure of 10$^{-4}$ to 10$^{-5}$ mmHg by the use of diffusion pump.

The cup was then hot-pressed by a super-pressure apparatus in the same manner as Example 9 to obtain a densely sintered compact.

EXAMPLE 12

A cup having an inner diameter of 5 mm, outer diameter of 8 mm and depth of 10 mm was formed by cutting a nickel rod. In the cup was filled a diamond powder of −400 mesh in a height of 8 mm, and thereon was laid a porous lid having a diameter of 5 mm and thickness of 1 mm made by sintering iron powder of +140 mesh and −100 mesh, on which was further put a copper piece.

The cup assembly was put in a vacuum furnace with a diffusion pump, and heated to 1150° C. by a rising rate of 500° C. per hour. Thereafter, this was hot-pressed by means of super-pressure and high temperature apparatus for making a diamond. As a heating element was used a graphite tube, and as an electrical insulation material was put a salt between the cup and tube. Further as a pressure medium was used pyrophyllite. Initially, the pressure was raised to 60 Kb, and then the temperature to 1500° C. by gradually supplying electrical current. The cup was held at the temperature for 5 minutes.

The obtained compact was crushed by compression, and examined by a microscope to find no pore at the broken face. As a result of analysis by an X-ray microanalyzer, solely nickel was observed.

EXAMPLE 13

A diamond powder of +300 mesh and −200 mesh was used in place of the powder of Example 12. Further instead of the solder piece of Example 12, a solder piece of Cu-40% Ni alloy was used.

The cup assembly was treated in vacuum in the same manner as Example 12 except that the highest temperature was 1300° C.

The obtained compact had a matrix mainly composed of nickel and was densely sintered.

EXAMPLE 14

There were used diamond powder having particle size ranging from 2 to 3 micron and a solder piece of Cu-20% Mn alloy, in places of the powder and solder piece of Example 12.

The cup assembly was treated in vacuum in the same manner as Example 12, except that the highest temperature was 950° C.

The obtained compact had a matrix mainly composed of nickel, and was densely sintered.

EXAMPLE 15

In Example 12, the hot-pressing was performed at a temperature of 1400° C., 1500° C. and 1600° C., respectively. The compact obtained at 1400° C. had a specific gravity of 3.86. However, as the temperature rose, the gravity increased linearly, and at 1600° C. it was 4.00. Also the nickel amount in the matrix increased as the temperature rose.

EXAMPLE 16

Instead of the porous lid of Example 12, a porous lid made by sintering Co powder was used, the cup having the same dimensions. In the same manner as Example 12, there was obtained a sintered compact, which exhibited good result similar to that of Example 12.

As described hereinbefore in detail, according to the present invention, a sintered compact having no pore can be efficiently and surely obtained since a powdered material to be sintered is completely degassed by the application of heat as well as vacuum to a cup filled with the material and at the same time a solder put on the opening of the cup is melted by said heat so as to air-tightly seal the cup, which is compressible under high pressure at high temperature during hot-pressing.

What is claimed is:

1. Process of producing a sintered compact comprising:
   filling a cup with a powdered material to be sintered;
   putting on an opening of the cup a covering member consisting of a lid and solder so as to permit ventilation between the interior and exterior of the cup to form a cup assembly;
   applying heat as well as vacuum to the cup assembly to degas the powdered material;
   melting the solder by the continuation of heat to air-tightly seal the cup with the lid to obtain a closed cup compressible under high pressure at high temperature while maintaining the air-tight seal; and
   hot-pressing the closed cup to obtain a sintered compact.

2. Process of producing a sintered compact as claimed in claim 1, wherein said covering member comprises a porous lid closing the cup and a solder put on said porous lid.

3. Process of producing a sintered compact as claimed in claim 1, wherein said covering member comprises a solder member put on the opening of the cup so as to permit ventilation and an air-tight lid put on said solder member.

4. Process of producing a sintered compact as claimed in claim 1, wherein said powdered material comprises a material selected from the group consisting of diamond, cubic boron nitride, mix of diamond with cubic boron nitride, and a mix of a binder with each of these materials, said hot-pressing being performed by means of a known super-pressure and high temperature apparatus for making a diamond.

5. Process of producing a sintered compact as claimed in claim 1, wherein said lid and cup are made of one selected from iron and iron base alloy, said solder consisting of one selected from copper and copper base alloys.

6. Process of producing a sintered compact as claimed in claim 2, wherein said lid and cup are made of one selected from iron and iron base alloys, said solder consisting of one selected from copper and copper base alloys.

7. Process of producing a sintered compact as claimed in claim 1, wherein said cup comprises one selected from nickel and nickel base alloys, said solder consisting of one selected from copper and copper base alloys.

8. Process of producing a sintered compact as claimed in claim 1, wherein at least a part of said cup comprises a porous material.

9. Process of producing a sintered compact as claimed in claim 1, wherein said powdered material having a particle size less than several microns is cold-pressed to form a green compact under pressures ranging from several ten to several thousand $Kg/cm^2$ before fillng in the cup.

10. Process of producing a sintered compact as claimed in claim 1, wherein said heat is applied to the cup assembly simultaneously to the application of vacuum.

11. Process of producing a sintered compact as claimed in claim 1, wherein said heat is applied to the cup assembly in hydrogen gas up to temperatures at which said solder melts and then said vacuum is applied to the cup assembly.

12. Process of producing a sintered compact as claimed in claim 1, wherein said powdered material is mixed with a binder and cold-pressed to form a green compact under a pressure ranging from several ten to several thousand $Kg/cm^2$ before filling the cup.

* * * * *